(12) United States Patent
Menon

(10) Patent No.: US 6,446,220 B1
(45) Date of Patent: Sep. 3, 2002

(54) UPDATING DATA AND PARITY DATA WITH AND WITHOUT READ CACHES

(75) Inventor: Jaishankar Moothedath Menon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/128,438

(22) Filed: Aug. 4, 1998

(51) Int. Cl.[7] ................................................. G06F 11/00
(52) U.S. Cl. ......................................................... 714/5
(58) Field of Search ............................ 714/5, 6, 42, 54; 711/152, 155

(56) References Cited

U.S. PATENT DOCUMENTS

| | | | |
|---|---|---|---|
| 4,733,352 A | | 3/1988 | Nakamura et al. |
| 4,916,605 A | | 4/1990 | Beardsley et al. |
| 5,140,592 A | * | 8/1992 | Idleman .................. 714/5 |
| 5,208,813 A | | 5/1993 | Stallmo |
| 5,293,618 A | | 3/1994 | Tandai et al. |
| 5,301,297 A | | 4/1994 | Menon et al. |
| 5,373,512 A | | 12/1994 | Brady |
| 5,375,128 A | | 12/1994 | Menon et al. |
| 5,437,022 A | | 7/1995 | Beardsley et al. |
| 5,490,248 A | | 2/1996 | Dan et al. |
| 5,499,337 A | | 3/1996 | Gordon |
| 5,526,482 A | | 6/1996 | Stallmo et al. |
| 5,530,830 A | | 6/1996 | Iwasaki et al. |
| 5,530,948 A | | 6/1996 | Islam |
| 5,546,535 A | * | 8/1996 | Stallmo ................... 714/9 |
| 5,572,660 A | | 11/1996 | Jones |
| 5,574,863 A | * | 11/1996 | Nelson ................... 710/100 |
| 5,574,882 A | | 11/1996 | Menon et al. |
| 5,636,359 A | | 6/1997 | Beardsley et al. |
| 5,640,530 A | | 6/1997 | Beardsley et al. |
| 5,664,187 A | | 9/1997 | Burkes et al. |
| 5,787,460 A | | 7/1998 | Yashiro et al. |
| 5,813,016 A | | 9/1998 | Sumimoto |
| 5,848,229 A | | 12/1998 | Morita |
| 5,913,227 A | | 6/1999 | Raz et al. |
| 5,940,856 A | | 8/1999 | Arimillii et al. |
| 5,940,864 A | | 8/1999 | Arimilli et al. |
| 5,999,930 A | | 12/1999 | Wolff |
| 6,073,218 A | * | 6/2000 | DeKoning .................. 711/150 |

OTHER PUBLICATIONS

Chen, P. et al., "RAID: High–Performance, Reliable Secondary Storage", *ACM Computing Surveys*, vol. 26, No. 2, pp. 145–185 (Jun. 1994).

IBM Brochure, "SSA RAID Adapter for PC Servers", pp. 1–2, ©International Business Machines Corporation 1996.

IBM Manual, "IBM PC ServeRAID Adapter—84H7117 Installation Instructions and User's Guide", 77 pages, First Edition (Jan. 1997).

(List continued on next page.)

Primary Examiner—Robert Beausoleil
Assistant Examiner—Bryce P. Bonzo
(74) Attorney, Agent, or Firm—Altera Law Group, LLC

(57) ABSTRACT

Disclosed is a system for updating data. A first processing unit, such as an adaptor, receives a data update to a data block in a first storage device, such as a hard disk drive. Parity data for the data block is maintained in a second storage device. A parity group is comprised of the data block and the parity data. After determining that the first processing unit does not control access to the parity group including the data block to update, the first processing unit sends a message to a second processing unit, such as another adaptor, controlling access to the parity group requesting control of access to the parity group. The first processing unit determines new parity data from the data update, the data at the data block in the first storage device, and the parity data in the second storage device. The first processing unit then writes the data update to the data block in the first storage device and the new parity data to the second storage device.

28 Claims, 6 Drawing Sheets

OTHER PUBLICATIONS

IBM Brochure, "3527 SSA Storage Subsystem for PC Servers", pp. 1–2, ©International Business Machines Corporation 1997.

IBM Brochure, "IBM PC ServeRAID Adds Two New Features", *IBM Personal computing solutions*, 12 pages (Dec. 16, 1997).

IBM Brochure, "IBM PC Server 704", *IBM Product Summaries, Personal Computing in Canada*, pp. 1–6, Last Published Jan. 16, 1998.

IBM Brochure, "SSA RAID Adapter for PCI", *IBM Storage*, pp. 1–5 (Jan. 16, 1998).

IBM Brochure, Serial Storage Architecture (SSA), *IBM Storage*, pp. 1–2 (Jan. 16, 1998).

IBM Spec Sheet, "PC Server Serial Storage Architecture (SSA) RAID Adapter Spec Sheet", *IBM Personal Computing, Canada*, p. 1, Last Published Nov. 1, 1998.

Hewlett Packard Brochure, "Dynamic RAID Technology From Hewlett–Packard Addresses Issues in Current High Availability", *Hewlett Packard, Enterprise Storage Solutions Division*, pp. 1–6 (Revised Apr. 1997).

Hewlett Packard Brochure, "What are Disk Arrays?", *Information Storage*, pp. 1–11 (Jan. 15, 1998).

Judd, I., et al., "Serial Storage Architecture", *IBM Journal of Research & Development*, vol. 40, No. 6—Nontopical issue, pp. 1–14 (Jan. 16, 1998).

Menon, J., "Performance of RAID5 Disk Arrays with Read and Write Caching", *Distributed and Parallel Databases*, vol. 2, pp. 261–293 (1994).

Menon, J. et al., "The Architecture of a Fault–Tolerant Cached RAID Controller", *Computer Science, Research Report*, pp. 1–28 (Jan. 22, 1993).

MYLEX Manual "DAC960SX Family User Guide, Ultra–SCSI to Ultra–SCSI RAID Controllers DAC960SX and DAC960SXI", Manual Version 1.0, Part No. 771975–D01, *Mylex*, ©Copyright 1997 Mylex Corporation.

Patterson, D. et al., "A Case for Redundant Arrays of Inexpensive Disks (RAID)", *ACM*, pp. 109–116 (1988).

Riegel, J. et al., "Performance of Recovery Time Improvement Algorithms for Software RAIDs", *IEEE*, pp. 56–65 (1996).

Cao, P. et al., "The TicketTAIP Parrallel RAID Architecture", *ACM Transactions on Computer Systems*, vol. 12, No. 3, pp. 230–269 (Aug. 1994).

Jim Handy, The Cache Memory Book, *Academic Press*, pp. 140–190.

* cited by examiner

UPDATING DATA AND PARITY DATA WITH AND WITHOUT READ CACHES

CROSS-REFERENCE TO RELATED APPLICATIONS

This application is related to the following co-pending and commonly-assigned patent applications, all of which are filed on the same date herewith, and all of which are incorporated herein by reference in their entirety:

"Distributed Storage System Using Front-End And Back-End Locking," by Jai Menon, Divyesh Jadav, Kal Voruganti, Ser. No. 09/124,004;

"System for Updating Data in a Multi-Adaptor Environment," by Jai Menon, Divyesh Jadav, Deepak Kenchammana-Hosekote, Ser. No. 09/128,574;

"System For Changing The Parity Structure Of A Raid Array," by Jai Menon, Divyesh Jadav, Deepak Kenchammana-Hosekote, Ser. No. 09/129,012;

"Updating And Reading Data And Parity Blocks In A Shared Disk System," by Jai Menon, Ser. No. 09/129,067; and "Updating and Reading Data and Parity Blocks in a Shared Disk System with Request Forwarding," by Jai Menon and Divyesh Jadav, Ser. No. 09/128,754.

BACKGROUND OF THE INVENTION

1. Field of the Invention

The present invention relates to a system for updating data and parity data in a shared disk system.

2. Description of the Related Art

In Redundant Arrays of Independent Disks (RAID) systems, data files and related parity are striped across multiple disk drives. In storage subsystems which manage numerous hard disk drives as a single direct access storage device (DASD), the RAID logic is implemented in the controller of the subsystem. RAID storage methodologies have also been implemented in software for execution on a single host computer. This allows the single host computer, such as a personal computer, to implement RAID storage techniques on local hard disk drive space. Such software RAID methodologies are described in "Algorithms for Software and Low Cost Hardware RAIDs," by Jai Menon, Jeff Reigel, and Jim Wyllie, Document No. 1063-6390/95, pgs. 411–418 (IEEE 1995), which is incorporated herein by reference in its entirety.

One problem with the single storage subsystem is the risk of failure. Techniques have been developed to improve failback and recovery in case of failures in the hardware controller. One such failback technique is the Fast Write Technique which provides two separate controllers on different power boundaries that control the flow of data from host systems to DASDs. If one controller fails, the other controller can continue writing data to the DASD. Typically a non-volatile storage unit (NVS) is included with each separate controller, such that each NVS connected to a controller backs up the data the other controller is writing to DASD. Such failback systems employing the two-controller failsafe structure are described in U.S. Pat. Nos. 5,636,359, 5,437,022, 5,640,530, and 4,916,605, all of which are assigned to International Business Machines, Corporation (IBM), the assignee of the subject application, and all of which are incorporated herein by reference in their entirety.

RAID systems can also be implemented in a parallel computing architecture in which there is no central controller. Instead, a plurality of independent controllers that control local hard disk storage devices are separate nodes that flnction together in parallel to implement RAID storage methodologies across the combined storage space managed by each node. The nodes are connected via a network. Parity calculations can be made at each node, and not centrally. Such parallel RAID architecture is described in "The TickerTAIP Parallel RAID Architecture," by Pei Cao, Swee Boon Lim, Shivakumar Venkatarman, and John Wilkes, published in ACM Transactions on Computer Systems, Vol. 12, No. 3, pgs. 236–269 (August, 1994), which is incorporated herein by reference in its entirety.

One challenge in shared disk systems implementing a parallel, shared disk RAID architecture is to provide a system for insuring that data and parity data are properly updated to disks in the system. Another challenge is to accomplish this goal of insuring data consistency and at the same time reduce the time to recover failed disks, reduce recovery time if both a disk and adaptor fail, and reduce network message traffic when handling data and parity updates.

SUMMARY OF THE INVENTION

To provide an improved system for handling updates to data and parity in a shared disk system, preferred embodiments of the present invention disclose a system for updating data. A first processing unit receives a data update to a data block in a first storage device. Parity data for the data block is maintained in a second storage device. A parity group is comprised of the data block and the parity data. After determining that the first processing unit does not control access to the parity group including the data block to update, the first processing unit sends a message to a second processing unit controlling access to the parity group requesting control of access to the parity group The first processing unit determines new parity data from the data update, the data at the data block in the first storage device, and the parity data in the second storage device. The first processing unit then writes the data update to the data block in the first storage device and the new parity data to the second storage device.

In further embodiments, a parity group set indicates a plurality of parity groups. The first processing unit determines a parity group set including the parity group including the data block to update after receiving the data update. The first processing unit then determines whether a first data structure indicates that another data block in the parity group set is being updated. If so, the first processing unit sends a parity group set message to the second processing unit including information on the parity group set including the data block to be updated and a third data structure indicating parity groups recently updated.

Preferred embodiments provide systems and methods for updating data and parity groups and at the same time minimizing network message traffic between the processing units, e.g., adaptors, in the system. Further embodiments use messaging to keep the second adaptor informed of the parity groups being updated. In this way, if the first adaptor fails, the second adaptor can readily determine the inconsistent parity groups that need to be updated or block access to the inconsistent parity groups before recovering failed data. Preferred embodiments seek to balance the goals of reducing message traffic and improving failure recovery time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
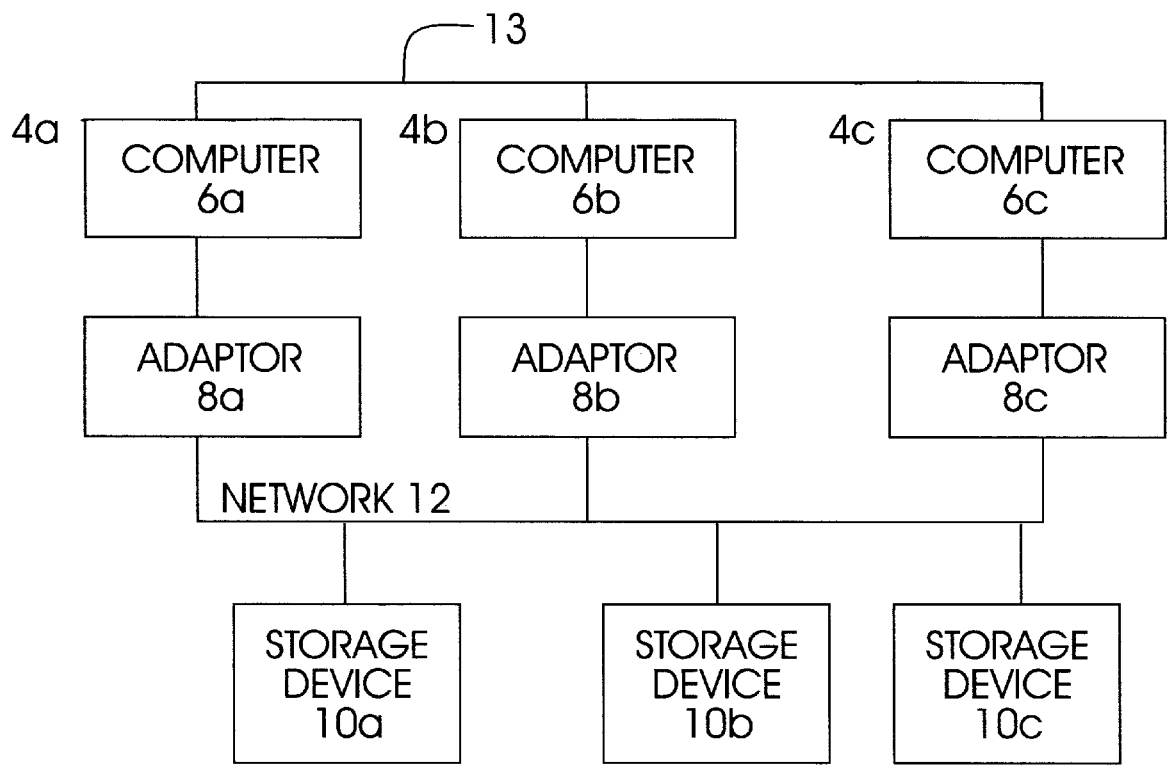
FIG. 1 illustrates a preferred hardware and software environment in which preferred embodiments of the present invention are implemented.

FIG. 1 illustrates a shared device environment comprised of nodes 4a, b, c. Each node includes a computer 6a, b, c, i.e., central processing unit, and an adaptor card 8a, b, c. A plurality of storage devices 10a, b, c interface via a network 12 to the adaptor cards 8a, b, c and attached computers 6a, b, c. The computer 6a, b, c may be a personal computer, workstation, mainframe, etc. The adaptor cards 8a, b, c interface with their respective computers 6a, b, c via a PC bus, such as the PCI bus, and include one or more disk interface ports, such as SCSI or Serial Storage Architecture (SSA) ports. The adaptor cards 8a, b, c include logic to execute the RAID algorithms. The storage devices 10a, b, c may be any suitable non-volatile storage device known in the art, including hard disk drives, magnetic tape, optical disks, non-volatile RAM, holographic units, etc. The nodes 4a, b, c and storage devices 10a, b, c interface via the network 12, which is preferably a high speed interconnect, such as SCSI, SSA, SNA, SAN, FDDI, etc. Additionally, the network 12 may be a SCSI or SSA bus. In further embodiments more nodes than shown may be included in the shared device system 2. Each node may include multiple adaptors, multiple processors and/or local (non-shared) storage devices.

FIG. 1 further illustrates an additional network 13 providing an additional communication line among the computers 6a, b, c. This additional network 13 may be comprised of any suitable network known in the art, e.g., ETHERNET, LAN, etc.

In preferred embodiments, the computers 6a, b, c run parallel processing software, such as the ORACLE PARALLEL SERVER™, the MICROSOFT® Wolfpack Clustering System or any other clustering software. ORACLE PARALLEL SERVER is a trademark of Oracle Corporation; MICROSOFT is a registered trademark of Microsoft Corporation. This parallel processing software allows the computers 6a, b, c to share storage devices 10a, b, c such that any node 4a, b, c may access any block in any of the storage devices 10a, b, c. This parallel architecture allows data to be distributed across different storage devices 10a, b, c throughout the shared device system 2. The parallel processing software, implemented in the computers 6a, b, c, may perform logical locking to insure that only one write request is made to a block in any of the storage devices 10a, b, c, at any given time and to insure that an application does not attempt to read a block being modified by another application. To perform logical locking under control of the parallel processing software, the computers 6a, b, c would exchange messages, data, and information via the additional network 13. The adaptors 8a, b, c perform physical locking.

Figure 2:
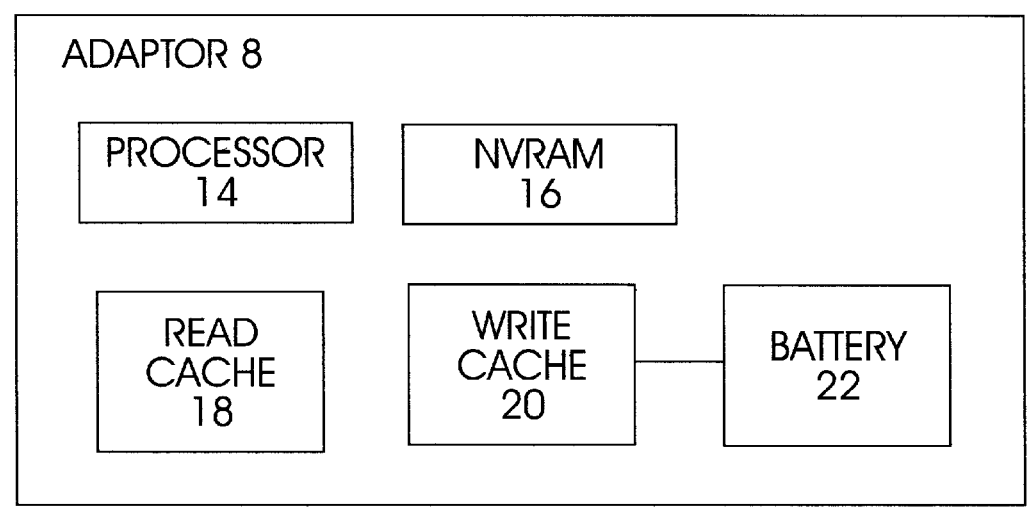
FIG. 2 illustrates a preferred hardware and software architecture of an adaptor in accordance with preferred embodiments of the present invention.

FIG. 2 illustrates a preferred embodiment of the adaptors 8a, b, c. Each adaptor 8a, b, c includes a processor 14a, b, c, a non-volatile RAM 16a, b, c for storing control information, a read cache 18a, b, c, and a write cache 20a, b, c. The read 18a, b, c and write 20a, b, c caches may be comprised of volatile memory, such as RAM, or a non-volatile memory unit, e.g., non-volatile RAM. In certain embodiments, the read cache 18a, b, c and write cache 20a, b, c may be areas within the same memory device or located within separate memory devices. In further embodiments, there may be no read 18a, b, c and/or write 20a, b, c caches. In preferred embodiments, the write caches 20a, b, c contain dirty blocks, which is data intended for a block in the storage device 10a, b, c that is more recent than the block actually maintained in the storage device 10a, b, c. Once the data is written from the write cache 20a, b, c to the storage device 10a, b, c, the copy of the data in the cache is "clean." Because the write cache 20a, b, c only maintains "dirty" blocks, the clean copy in the cache after the update is considered to be in the read cache 18a, b, c, not the write cache 10a, b, c anymore. The components of the adaptors 8a, b, c may be implemented as PC cards such the PC ServeRAID SCSI adaptor from IBM. Alternatively, components and functionality of the adaptors 8a, b, c could be implemented in the computers 6a, b, c.

In certain embodiments, the read cache 18a, b, c may be implemented in a volatile memory device, e.g., DRAM, RAM, etc., and the write cache 20a, b, c may be attached to a battery 22 which makes the write cache 20a, b, c a non-volatile memory device. In such case, an update to a block is initially written in both the RAM (read cache) and the battery 22 backed up write cache 20a, b, c. Once the dirty data is destaged to the storage device 10a, b, c, the copy from the write cache 20a, b, c is marked as invalid for later removal, leaving only the clean copy in the RAM, i.e., read cache. In alternative embodiments, the dirty data may be sent to all other adaptors in the system to invalidate any stale data in their caches. In embodiments with only a single memory device for the read 18a, b, c and write 20a, b, c caches, the data is considered to be in the write cache 20a, b, c prior to destaging and in the read cache 18a, b, c after destaging even though the data remains in the same memory device.

In preferred embodiments, the adaptors 8a, b, c must satisfy all of the following correctness conditions:
 (1) a request to write a data block from adaptor 8a simultaneous with a request to write another data block from adaptor 8b, where the two data blocks have the same parity block, causes a correct parity update in the sequence which the updates were made;

(2) a write request through one adaptor 8a for a block in the read 18b or write 20b cache at another adaptor 8b causes the invalidation of data in cache 18b or 20b so that stale data is not returned to a subsequent read request or later destaged to the storage device 10b from old data in caches 18b, 20b; and (3) a read request through one adaptor 8a for a block cached at adaptor 8b in read 18b or write 20b cache, returns the latest version of the data block from adaptor 8b.

Those skilled in the art will recognize that alternative conditions to the three mentioned above may also be satisfied.

Parity in a RAID Environment

Figure 3A:
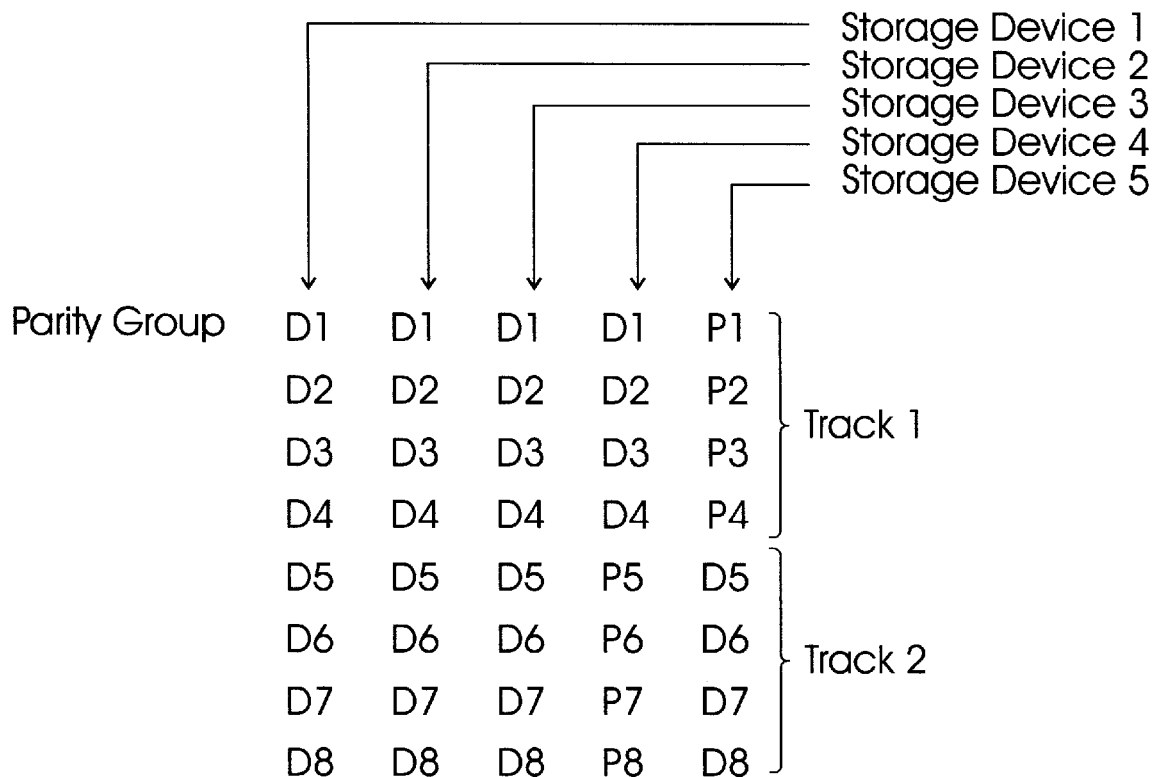
FIGS. 3a and b illustrate embodiments of how data and parity blocks are arranged on storage devices.

FIG. 3a illustrates a 4+P RAID disk array in which a parity block $P_i$ protects four data blocks $D_i$ in four storage devices. Each vertical column represents a storage device. A parity group is a row in the illustration of FIG. 3a that consists of four data blocks $D_i$, one in each storage device, and a parity block $P_i$ maintaining parity information for the four data blocks $D_i$. A parity value $P_i$ is the exclusive OR of the data blocks $D_i$ in the same parity group of a given i. If a disk fails, then the data can be recreated by processing the parity block ($P_i$) and the remaining data blocks $D_i$ for the parity group. FIG. 3a further shows the rotation of parity in that parity blocks $P_5$ through $P_8$ are on a different disk, storage device 4, than the previous parity blocks which are on storage device 5.

In preferred embodiments, a parity block can be updated with the following exclusive OR operation, where the new parity $(P_i')$=(old data $(D_i)$ XOR new data $(D_i')$) XOR old parity $(P_i)$.

Figure 3B:

In certain embodiments, data may be stored in "stripe units" on the storage devices. FIG. 3b illustrates a "stripe unit" of data. A stripe unit consists of multiple consecutive blocks of data on a storage device. The "stripe unit" shown in FIG. 3b has two consecutive blocks of data, blocks 1 and 2. A "stripe" consists of multiple stripe units. The "stripe" shown in FIG. 3b has five stripe units. In the exemplar of FIG. 3b, a stripe unit includes blocks from two parity groups throughout each storage device. In alternative embodiments a "stripe unit" and "stripe" could be defined in alternative manners, e.g., including more than two blocks of data, depending on the number of storage devices and parity groups.

In alternative embodiments, other parity schemes may be utilized, such as mirrored RAID, bit-interleaved parity, block-interleaved distributed-parity or P+Q redundancy, etc. These various RAID schemes are discussed in "RAID: High-Performance, Reliable Secondary Storage," by Peter M. Chen, Edward K. Lee, Garth A. Gibson, Randy H. Katz, and David A. Patterson, published in ACM Computing Surveys, Vol. 26, No. 2, pgs. 145–185 (June, 1994), which publication is incorporated herein by reference in its entirety.

Front End and Back End Locking Schemes

A write cache 20a, b, c in an adaptor 8a, b, c that stores data that is more recent than the version of that data in the corresponding block in the storage device 10a, b, c is a "dirty block." When data is first updated from D to D', the dirty data D' is stored in the read cache 18a, b, c and in the battery backed-up write cache 20a, b, c. Once the dirty data is destaged from the write cache 20a, b, c to the storage device 10a, b, c, the read cache 18a, b, c copy is referred to as a "clean block." After destaging, any backup copy of the dirty data in the write cache 20a, b, c may be eliminated, leaving only a "clean" copy of the destaged "dirty data" in the read cache 18a.

Data is transferred to a node 4a, b, c for storage in the attached storage device 10a, b, c in two phases, a front-end phase and a back-end phase. A front-end lock refers to a state associated with a block of data to which a read or data update request is directed, whether a version of that block of data is located in the storage device 10a, b, c, read cache 18a, b, c, or write cache 20a, b, c. A back-end lock refers to a state associated with a data block maintaining parity data or involved in a destaging operation.

In the front-end phase, data is written to the write cache 20a, b, c, but not moved to the attached storage device 10a, b, c. In the back-end phase, data is destaged from the write cache 20a, b, c to the attached storage device 10a, b, c. The adaptors 8a, b, c at each node 4a, b, c include logic, e.g., software and/or hardware, to issue locking commands to control access to the data block represented by the lock unit, whether the most recent version of that data block is maintained in the storage devices 10a, b, c, read cache 18a, b, c, or write cache 20a, b, c. An adaptor 8a, b, c cannot access data unless that adaptor controls or owns the lock unit for that data block. Locking commands to control access to data insure that stale data at any adaptor 8a, b, c is invalidated and that a read request gets the most current copy of data, wherever that most current copy of data may reside in the shared device system 2. Further, the back-end phase of locking insures that updates of parity blocks on the disk drives are synchronized. As discussed, parity data is stored throughout the shared device system 2, such that a storage device 10a, b, c may include parity for data maintained throughout the shared device system 2.

A lock state applies to one or more data blocks referred to as a locking unit. A version of data maintained in the storage devices 10a, b, c may be maintained in the read 18 or write 20 caches. A lock state could apply to a data block lock unit, whether that data block is maintained only in the storage device 10a, b, c and versions of the lock unit data block maintained in the read 18 or write 20 cache. For front-end locks, the locking unit may be a data block or any other grouping of data. For back-end locks that apply to the parity data, the locking unit may be a parity group. In preferred embodiments, the front-end and back-end locking schemes are separate and do not conflict. Thus, parity updates can be done independently of data updates. In alternative embodiments, a unified locking scheme may be used. In a unified locking scheme, parity data or data in the write cache 20a, b, c cannot be updated if another adaptor 8b is involved in a destage operation.

In the front end phase, locking is used to insure that update requests invalidate stale data in the read 18a, b, c or write 20a, b, c caches of other adaptors 8a, b, c and that read requests get the most current copy of data. In the back end phase, locking is used to insure that update of parity on the storage devices 10a, b, c are synchronized between different adaptors updating to the same parity block. For the front end phase, an appropriate lock unit might be a data block, stripe, or any other unit of data involved in read or write operations. For the back end phase, the lock unit might be the parity group for the unit of updated data.

In certain embodiments, only an adaptor 8a, b, c that is designated the "owner" of a lock unit may place a lock on the lock unit. Such embodiments requiring lock ownership are described in the related application "Distributed Storage System Using Front-End And Back-End Locking," Ser. No. 09/129,067, incorporated by reference above. In embodiments without lock ownership, access is controlled by designating two or more adaptors 8a, b, c as the "primary adaptors" for a lock unit. Only primary adaptors can access the area of the storage device 10a, b, c corresponding to the lock unit. If an adaptor other than the primary adaptor originates a request for a particular lock unit, i.e., data block or stripe, the request is forwarded to one of the primary adaptors.

Updates and Failure Recovery when no Read and Write Caches

In adaptors 8a, b, c without read caches 18a, b, c, the only correctness condition that must be satisfied is that when updates are made to data blocks in the same parity group, updates to the parity block should be made in the same manner that the updates were made to insure correct parity calculations. In preferred embodiments, locks are obtained for parity groups before a data block in a parity group may be updated. However, in alternative embodiments, the lock may apply to a stripe or multiple stripes within multiple parity groups. In preferred embodiments, each adaptor 8a, b, c maintains information on lock ownership. In the two adaptor case, the other adaptor does not need to include a table on what locks the other adaptor owns because an adaptor can infer locks the other adaptor owns by locks the adaptor owns. The adaptors 8a, b, c may communicate via the network 12 to request lock ownership from the other adaptors.

Figure 4:
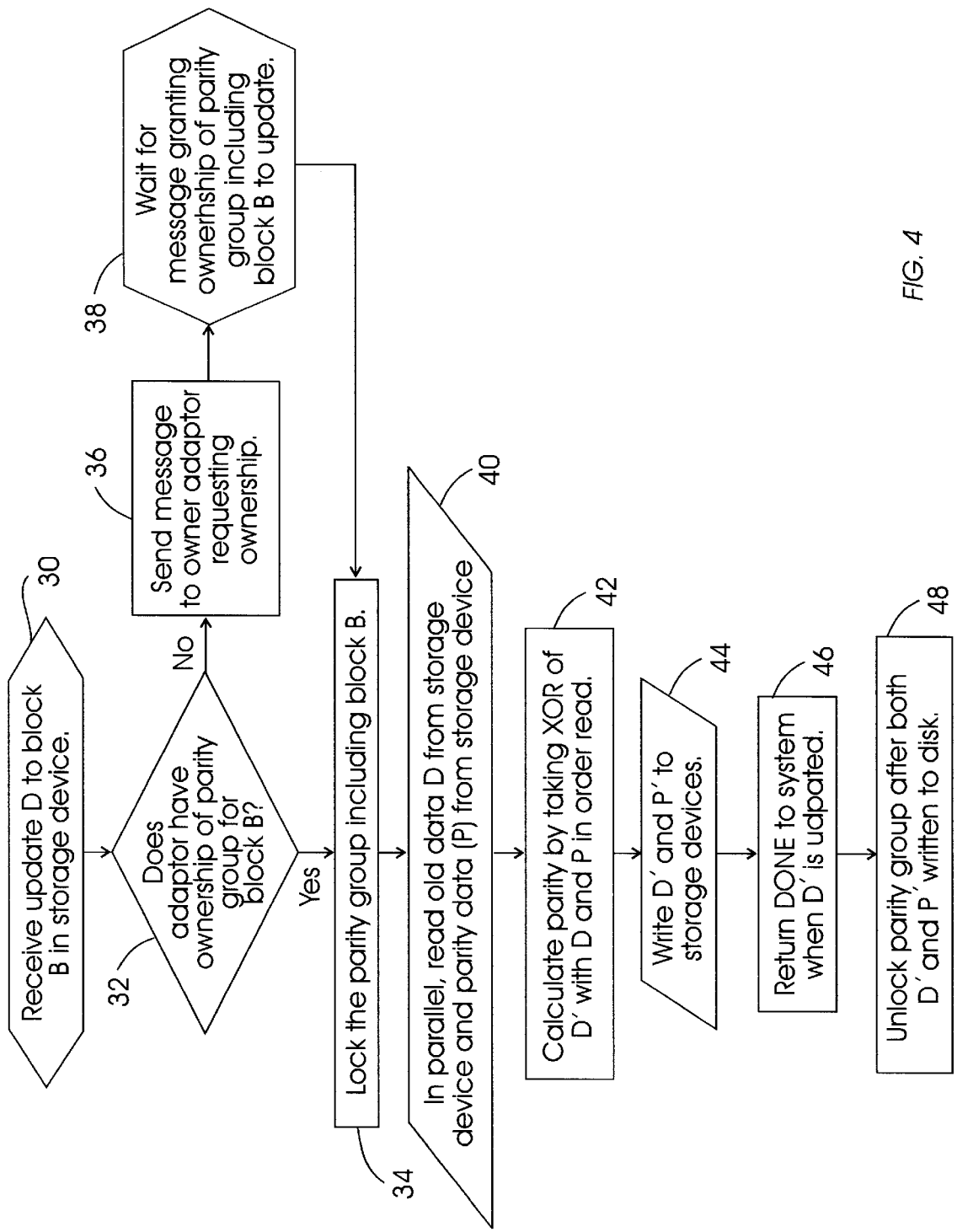
FIG. 4 illustrates logic implemented in the adaptors to update data in accordance with preferred embodiments of the present invention.

FIG. 4 illustrates logic implemented in the adaptors 8a, b, c to update old data D with update data D' in block B in a storage device, e.g., storage device 10a. The parity data P for the data block B being updated is in another storage device, e.g., storage device 10b. Control begins at block 30 which represents an adaptor, e.g., adaptor 8a, receiving an update D' to data D at block B. Control transfers to block 32 which represents the adaptor 8a determining whether it has ownership of the parity group including the block B to update. If so, control transfers to block 34; otherwise, control transfers to block 36. Block 36 represents the adaptor 8a sending a message to the owner adaptor requesting lock ownership. Control then transfers to block 38 which represents the requesting adaptor 8a waiting for the message granting lock ownership. In the N adaptor case, when N>2, the other N-1 adaptors must be notified when lock ownership changes so they can update their lock ownership tables to accurately reflect the current state of lock ownership.

Once the adaptor 8a has lock ownership, control transfers to block 34 which represents the adaptor 8a locking the parity group including the block B to update. Control then transfers to block 40 which represents the adaptor 8a reading in parallel the old D from the storage device 10a and the parity data P from the storage device 10b. Control transfers to block 42 which represents the adaptor 8a calculating parity P' as D' XOR D XOR P. The adaptor 8a will start the parity calculation process as soon as it retrieves D and P from the storage devices 10a, b. Thus, the order of parity calculation depends on when the D and P are received. Control then transfers to block 44 which represents the adaptor 8a writing D' and P' to the storage devices 10a, b. Control transfers to block 46 to return DONE to the system. In preferred embodiments, DONE may be returned after D' is written to the storage device even if the new parity data P' has not yet been updated. At block 48, the adaptor 8a unlocks the parity group after the D' and P' are written.

The logic of FIG. 4 insures that multiple, simultaneous updates to a storage device are correctly handled, with parity being updated to insure that parity is updated in the order that updates are received.

If an adaptor fails during the update algorithm of FIG. 4, the surviving adaptor, e.g., adaptor 8b, can recover by examining the parity groups owned by the failed adaptor as indicated in the data structure indicating parity groups owned by the other adaptor. The surviving adaptor 8a would then determine from the data at the data block and the parity data which parity groups that surviving adaptor 8a does not own are inconsistent, i.e., which parity groups have parity data which is outdated because of an update D'. To determine inconsistency of the parity groups that the surviving adaptor 8a does not own, the surviving adaptor 8a will have to recalculate parity from all the data in the parity group and determine whether this calculated parity differs from the stored parity for the parity group. If the parity is inconsistent, then the surviving adaptor 8a will update the stored parity data with the calculated new parity data P'.

Figure 5:
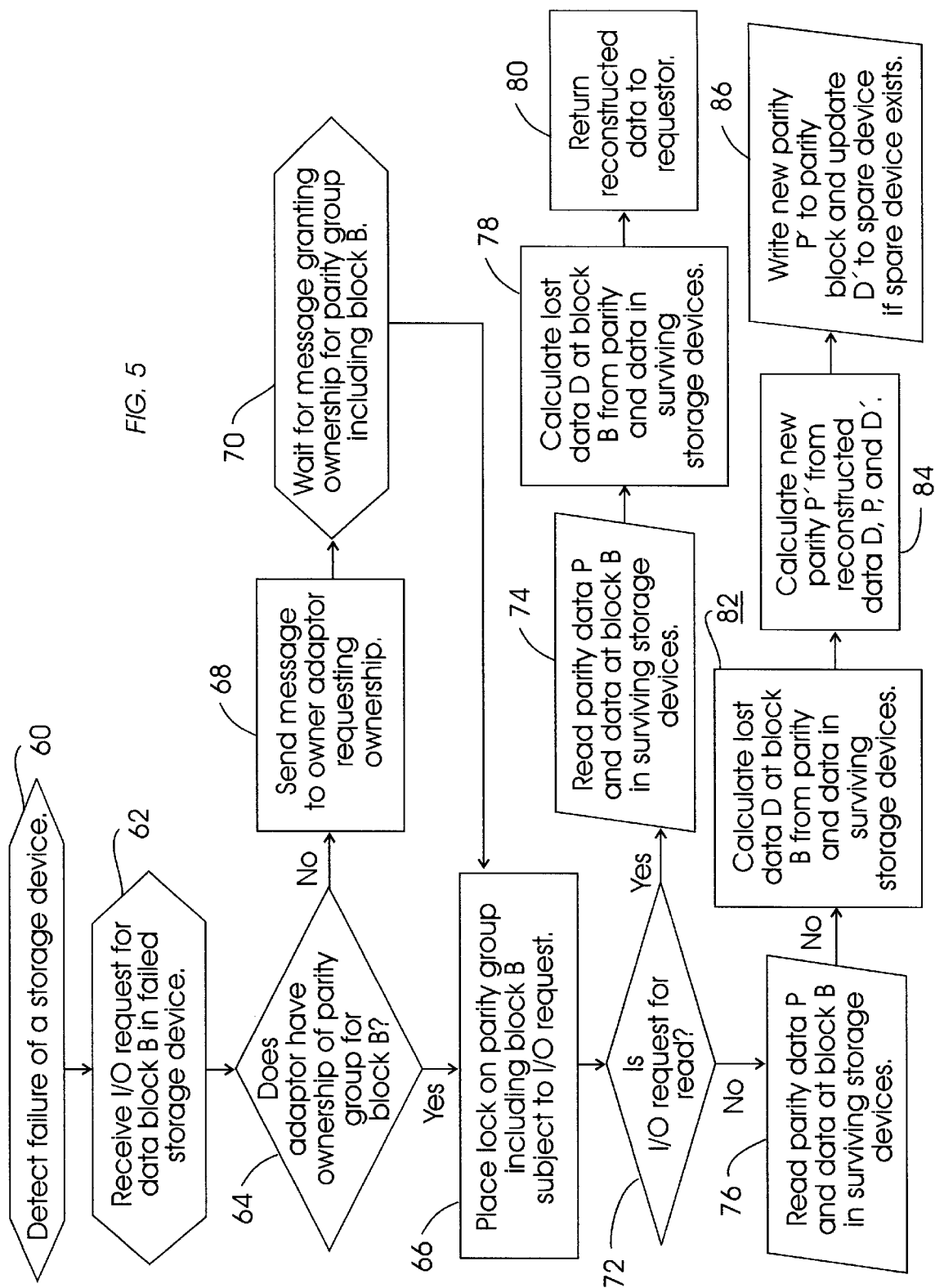
FIG. 5 illustrates logic implemented in the adaptors to handle an I/O request to a parity group in the event that the storage device including the data subject to the I/O request fails in accordance with preferred embodiments of the present invention.

FIG. 5 illustrates preferred logic implemented in the adaptors 8a, b, c to handle the failure of a storage device 10a, b, c, e.g., storage device 10a, when an input/output (I/O) operation is directed to data in the failed storage device. For instance, an I/O request may be to data D in block B in failed storage device 10a, for which parity data P is maintained in storage device 10b. Control begins at block 60 which represents the adaptors 8a, b, c detecting a failure of the storage device 10a. Control transfers to block 62 which represents an adaptor, e.g., adaptor 10a, receiving an I/O request for data D in block B in the failed storage device 10a. Control transfers to block 64 which represents the adaptor 64 determining whether it has ownership of the lock for the parity group including the block B to which the I/O request was directed. If so, control transfers to block 66 otherwise, control transfers to block 68. At block 68, the adaptor 68 sends a message to the adaptor having lock ownership requesting lock ownership. Control then transfers to block 70 which represents the adaptor 8a waiting to receive a message from the owning adaptor granting lock ownership. As discussed, if there are more than two adaptors, every adaptor may include a table indicating the adaptor that owns each parity group. In the two adaptor case, such a table is not necessary.

When the adaptor 8a has lock ownership, control transfers to block 66 which represents the adaptor 8a placing a lock on the parity group that prevents any other adaptor from accessing the data blocks in such parity group. Control then transfers to block 72 which represents the adaptor 8a determining whether the I/O request is a read request. If so, control transfers to block 74; otherwise, control transfers to block 76. If the request is a read request, then at block 74 the adaptor 8a reads the parity data P and data at block B in the surviving storage devices. Control transfers to block 78 which represents the adaptor 8a reconstructing the data at block B in the failed storage device 10a using a logic XOR equation of the parity data P and data at block B in surviving storage devices. Control then transfers to block 80 which represents the adaptor 8a returning the reconstructed data to the requester, which may be an application program or other requesting device.

If the I/O request was a write request, then at block 76, the adaptor 8a reads the data and parity data as described with respect to block 78. Control then transfers to block 82 where the adaptor 8a calculates the lost data in the manner described at block 78. Control then transfers to block 84 which represents the adaptor 8a calculating new parity P' from the reconstructed data D, update data D' and old parity P by taking the logical XOR of such data. In alternative embodiments, alternative methods and equations may be used to calculate the parity other than the logical XOR equation. Control then transfers to block 86 which represents the adaptor 8a writing the new parity P' to the parity block and the data update to a new storage device if in rebuild mode and a spare disk exists.

In processing I/O requests under the preferred logic of FIG. 5, the adaptors 8a, b, c would be operating in a degraded mode in that they must reconstruct the data before handling the I/O request. If a spare storage device exists, the adaptors 8a, b, c could rebuild the data on the failed storage device using the parity data and surviving data and write such reconstructed data to the spare storage device. The rebuild operation may be handled by only one adaptor or shared between multiple adaptors. To proceed with rebuilding, the adaptors would have to obtain lock ownership of the data block being reconstructed before proceeding. In certain embodiments, to minimize messaging, the data would be rebuilt by the adaptor that has lock ownership of the data block to be rebuilt. In yet further embodiments, the adaptors may communicate providing information on rebuilt data so any I/O request to such rebuilt data block will be handled by accessing the rebuilt data without having to proceed with the logic of FIG. 5 to again reconstruct the data block in the failed storage device.

Figure 6:
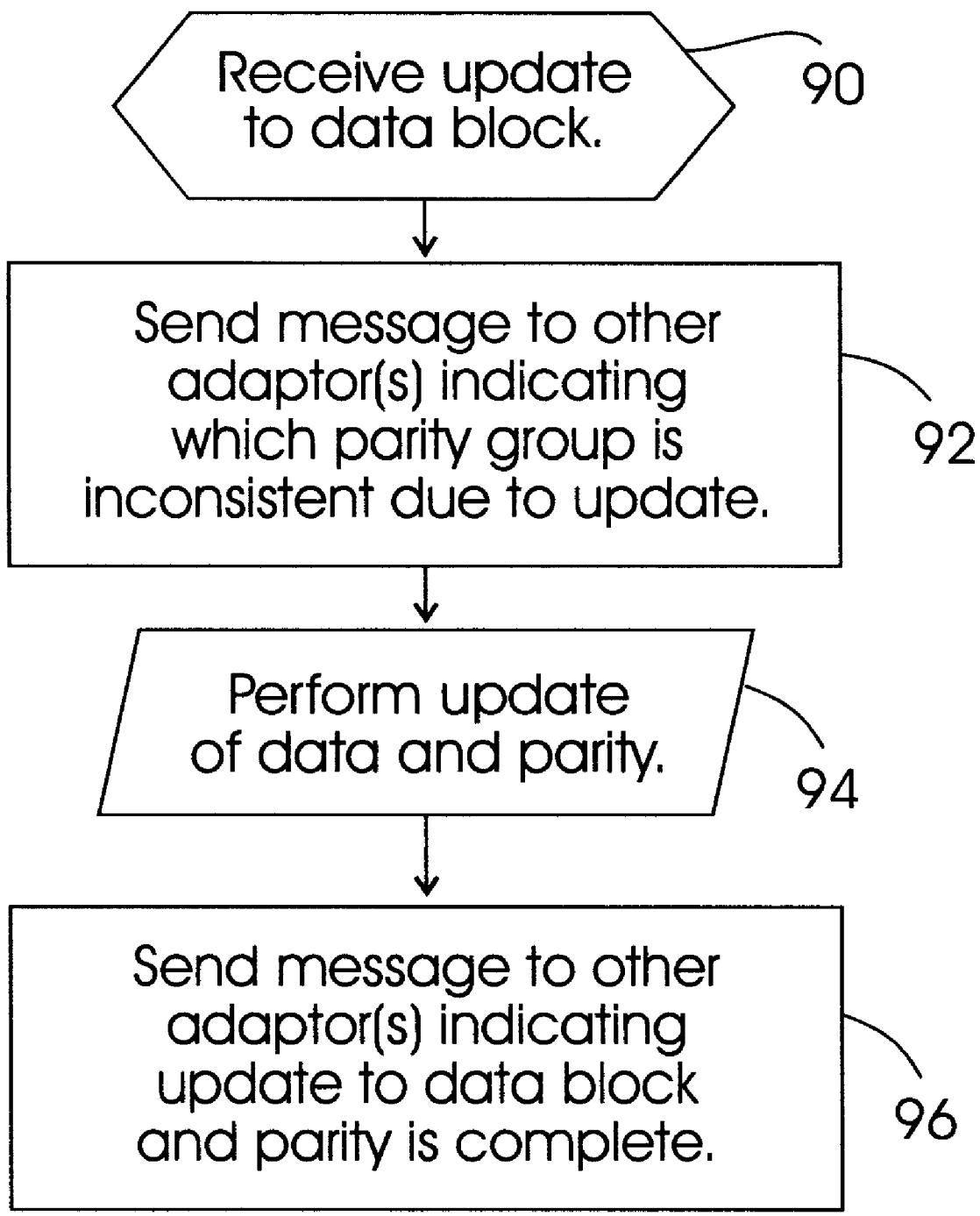
FIG. 6 illustrates logic implemented in the adaptors to update data blocks when a storage device has failed in accordance with preferred embodiments of the present invention.

FIG. 6 illustrates logic executed by the adaptors 8a, b, c to execute when in a degraded or rebuild mode handling a storage device failure. Control begins at block 90 which represents an adaptor, e.g., adaptor 8a, receiving an update to data block B in a storage device, e.g., storage device 10a. Control then transfers to block 92 which represents the updating adaptor 8a, operating in a degraded mode, sending a message to the other adaptor indicating which parity group is inconsistent as a result of the data update received. Control transfers to block 94 which represents the updating adaptor 8a performing the update to data and parity, pursuant to the update algorithm of FIG. 5. After completing the update, control transfers to block 96 which represents the adaptor 8a sending a message to the other adaptor indicating that the update to the data block B and parity is complete. The other adaptors would maintain a data structure to indicate which parity groups the updating adaptor 8a was updating.

With the logic of FIG. 6, if an adaptor fails while updating data in a degrade mode, the surviving adaptor(s) will know which parity groups include inconsistent data. Thus, when denying access to data blocks, the surviving adaptor(s) need only deny access to data blocks that are members of inconsistent parity groups, i.e., those parity groups where data and parity was not completely updated when the adaptor 8a failed. The adaptors may terminate the logic of FIG. 6, i.e., the extra messaging before and after updates, as soon as rebuild is complete and then return to the update algorithm of FIG. 4, which requires a message exchange only if the update request is to a data block in a parity group that the updating adaptor does not own.

Locking Algorithms with PGS Communication

Parity Group Set (PGS) methods provide a bit map for keeping track of parity groups involved in data updates. A parity group set may comprise multiple parity groups, e.g., the first 100 parity groups in the first PGS, the second 100 parity groups in the second PGS, etc. A PGS bit map would keep track of which parity group sets include parity groups whose data blocks are being updated, i.e., have inconsistent data. The use of PGS bit maps and methods is described in U.S. Pat. No. 5,574,882, entitled "System and Method for Identifying Inconsistent Parity in an Array of Storage," which patent is assigned to IBM and which patent is incorporated herein by reference in its entirety. The use of PGS communication requires additional messaging to keep adaptors informed of which PGS are being updated. However, using PGS systems can provide for a faster recovery time in the event of an adaptor failure.

In preferred embodiments, each adaptor 8a, b, c maintains a PGS bit map indicating which parity group sets are being updated. With PGS, an adaptor need only communicate the handling of an update request if the update request is to a parity group in a PGS group that is not currently indicated as inconsistent. For instance, when an adaptor handles an update to a parity group in a PGS already indicated in the PGS bit map as an inconsistent PGS group, the updating adaptor does not have to message the other adaptor of the update because the other adaptor has already indicated in its PGS bit map that the PGS group is inconsistent. Each adaptor may also maintain a PGS count data structure indicating the number of parity groups in a PGS group currently begin updated. The adaptors 8a, b, c may further include a recently become consistent list indicating those PGS groups that recently became consistent, i.e., had their data and corresponding parity blocks updated.

Figure 7:
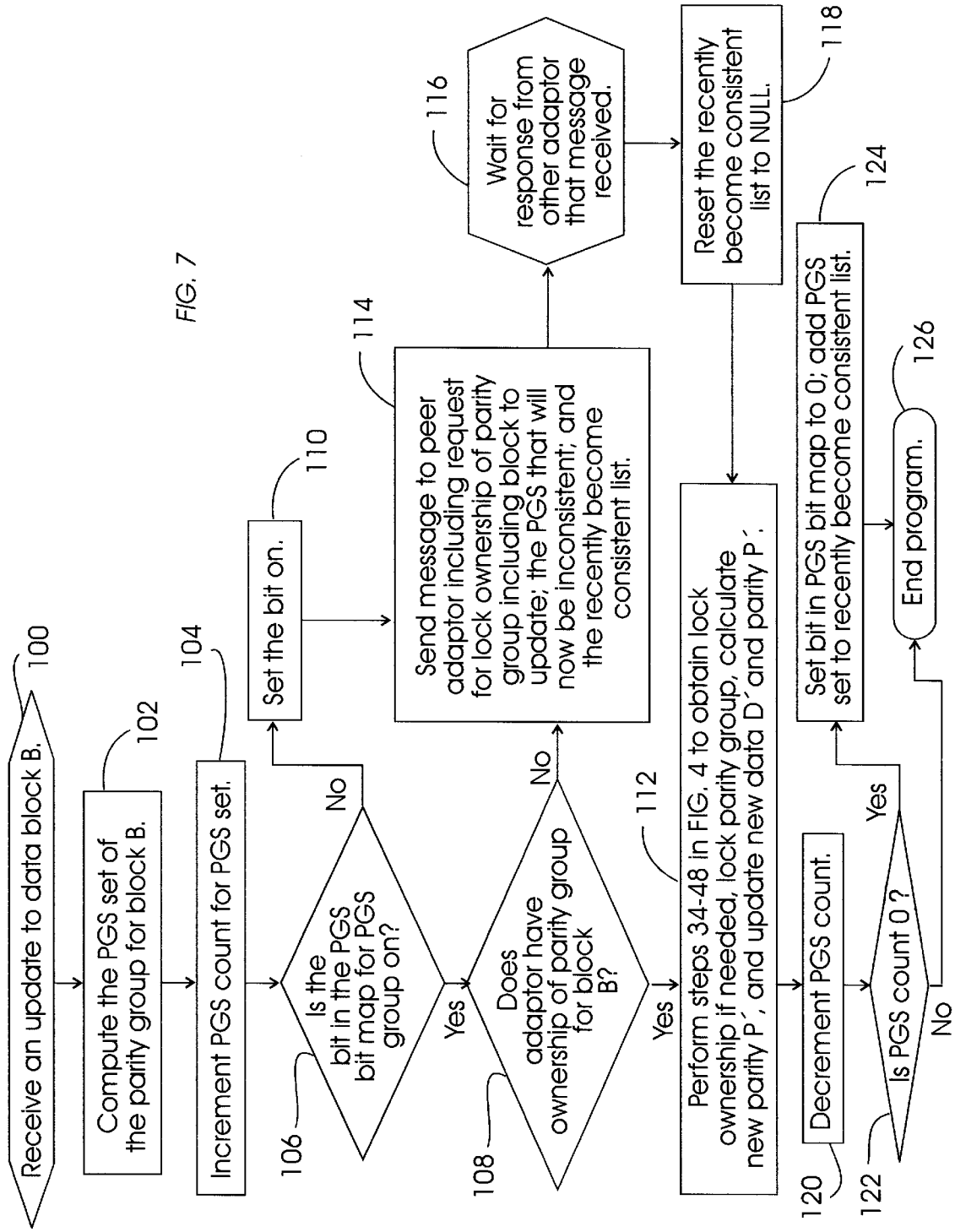
FIG. 7 illustrates logic implemented in the adaptors to update a data block using a parity group set (PGS) messaging system in accordance with preferred embodiments of the present invention.

FIG. 7 illustrates logic implemented in adaptors 8a, b, c including the PGS bit map, PGS count data structure, and a recently became consistent data structure list to update data block B including data D with updated data D' in a storage device, e.g., storage device 10a, wherein the parity data P for the data block is maintained in another storage device, e.g., storage device 10b. In the preferred logic of FIG. 7, each adaptor has a peer which maintains information on which PGS sets in the other adaptor are inconsistent. Thus, two adaptors control the locks for each parity group. In alternative embodiments there may be more than two adaptors maintaining locks, i.e., control of each parity group. Control begins at block 100 which represents an adaptor, e.g., adaptor 8a, receiving a request to update block B with data D'. Control transfers to block 102 which represents the adaptor 8a determining the PGS set including the parity group of the data block B to be updated. Control then transfers to block 104 which represents the adaptor 8a incrementing the PGS count data structure for the PGS set including the block B to be updated. Control transfers to block 106 which represents the adaptor 8a determining whether the bit in the PGS bit map for the PGS set being updated is on, i.e., indicating that another parity group in the PGS set is concurrently being updated. If so, control transfers to block 108; otherwise, control transfers to block 110.

If the bit in the PGS bit map for the PGS group is not set to binary "on", then at block 110, the adaptor 8a sets the bit to "on." If the bit was already "on," then at block 108, the updating adaptor 8a determines whether it has ownership of the parity group for the block B to update. From blocks 108 or 110, control transfers to block 114 which represents the updating adaptor 8a sending a message to the peer adaptor 8b including a request for lock ownership of the parity group including the block B to update, the PGS set that will now be inconsistent and the recently became consistent list maintained by adaptor 8a. When the peer adaptor 8b receives this message, the peer can adjust its recently became consistent list to include PGS sets that recently became consistent with the updating adaptor 8a. From block 114, control transfers to block 116 which represents the updating adaptor 8a waiting for a response from the peer adaptor 8b to the message. After receiving the response, control transfers to block 118 which represents the updating adaptor 8a setting its recently became consistent list to NULL. Note that by combining the parity request, with information on the inconsistent PGS set, and the recently become consistent list into a single message, message traffic is minimized. Note that at block 114, if the adaptor 8a has lock ownership of the parity group to update, the message sent at block 114 would not need to include a request for lock ownership.

After the PGS bit map accurately reflects the inconsistent parity group, then from blocks 108 or 118, control transfers to block 112 which represents the updating adaptor performing the logic steps of 34 through 48 in FIG. 4 to obtain lock ownership if needed, lock the parity group, calculate the new parity P', and update the data block B with the new data D' and the parity with P'. After the data D' and parity P' has been updated, control transfers to block 120 which represents the updating adaptor 8a decrementing the PGS count field for the PGS set including the parity group just updated. Control then transfers to block 122 which represents the updating adaptor 8a determining whether the PGS count field is zero. If so, control transfers to block 124 to set the bit in the PGS bit map corresponding to the PGS set having no inconsistent parity groups to binary zero and adding the PGS set to the recently became consistent list. Control then proceeds to block 126 to end the program. If the PGS count is greater than zero, control transfers to block 126 to end the program as the PGS set has other parity groups that are inconsistent. In alternative embodiments, the updating adaptor 8a may delay resetting the PGS bit map for the PGS set just made consistent to determine if another parity group in the PGS set becomes inconsistent during the delay period. This avoids the communication and processing need to set and immediately thereafter reset the bit in short intervals.

Updating Data and Parity when the Adaptors Include Read Ccaches

If the adaptors 8a, b, c include read caches 18, then the algorithms should satisfy two correctness conditions: (1) when an update occurs to different blocks having the same parity block, parity is likewise updated and (2) an update request through one adaptor, e.g., adaptor 8a, which is cached at another adaptor, e.g., adaptor 8b, causes the invalidation of the caches in the other adaptor 8b so that the adaptor 8b does not return or destage stale data is proper. To perform an update when read caches 18a, b, c are available, the adaptors 8a, b, c would execute the logic of FIG. 4 with the following modifications.

The modification to the logic of FIG. 4 is that the updating adaptor, e.g., adaptor 8a, would send a message to the other adaptor(s) requesting the other adaptor(s) to invalidate the data block to update in their read cache(s) to insure that the stale data in their read cache is not returned. If the updating adaptor 8a is not the owner of the lock unit, then at block 36, the updating adaptor 8a could incorporate the request to invalidate stale data with the message requesting lock ownership. Another difference is that the updating adaptor 8a does not have to read the old data D at block 40 if the old data D is present in the read cache 18a.

Scalability

In embodiments where there are more than two adaptors, i.e., N adaptors, certain modifications must be made. For instance, in the logic of FIG. 4, the updating adaptor must broadcast a message to all adaptors indicating a change of ownership and the new owner of the lock for the parity group. Initially, each of the N adaptors may be responsible for 1/N of the parity groups. As updating adaptors request lock ownership this initial distribution may change. The messaging to all N adaptors upon a change of ownership insures that all adaptors are informed of ownership changes with respect to any of the lock units, e.g., parity groups, stripe units, etc.

In an alternative embodiment, the adaptor which is the original owner of the lock at initialization may be responsible for handling all requests for lock ownership. In such case, the up dating adaptor need only inform the original owning adaptor of the change in ownership. Another adaptor subsequently requesting ownership of such block would first go to the original owning adaptor, and the original owning adaptor would forward the request to the current owner. This reduces messaging because all N adaptors do not need to be informed upon each change of ownership.

In a multi-adaptor case using the logic of FIG. 7 an d PGS messaging, adaptors can operate in pairs. Each peer adaptor is responsible for taking over if the other peer fails. If a non-peer adaptor receives an update request, the non-peer can forward the request to one of the pairs. In this way, adaptors can be added in pairs.

CONCLUSION

This concludes the description of the preferred embodiments of the invention. The following describes some alternative embodiments for accomplishing the present invention.

In preferred embodiments, adaptors 8a, b, c interface the nodes 4a, b, c to allow sharing of storage resources. The adaptors 8a, b, c were described as having specific components, such as a processor 14a, b, c, NVRAM 16a, b, c, read cache 18a, b, c, write cache 20a, b, c, and NVS unit 22a, b, c. In alternative embodiments, some or all the components of the adaptors 8a, b, c may be located elsewhere in the node 4a, b, c or share resources with the computer 6a, b, c. In yet further embodiments, there may be a central computing resource or node that monitors or controls intercommunication between the nodes 4a, b, c.

In further embodiments, the adaptors 8a, b, c may share NVRAM 16a, b, c maintaining information on inconsistent parity groups across adaptors 8a, b, c. In yet further embodiments, some or all of the parity calculations, e.g., XOR operations, may be performed by the storage devices 10a, b, c instead of the adaptors 8a, b, c.

The write cache 20a, b, c and read cache 18a, b, c may be memory locations within a single memory device or memory locations within a separate memory device, comprised of any suitable memory device known in the art, including volatile and non-volatile memory devices.

The logic of FIGS. 4–7 is for illustrative purposes. The logic may be implemented in memory areas of the adaptors 8a, b, c, e.g., a ROM embedded in the adaptor. Alternatively, the logic may be implemented in the computers 6a, b, c, which in turn control the adaptors 8a, b, c to update and read a block of data in a storage device 10a, b, c. Additional or alternative steps may be performed in addition to those illustrated in the logic. Further, the order of the steps in the preferred logic may also vary.

Updated parity P' was calculated by taking the exclusive OR of the old data D, new data D', and old parity P. However, those skilled in the art will appreciate that alternative methods known in the art for determining parity may be used in addition to the exclusive or (XOR) operation described herein.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, preferred embodiments disclose a system for updating data. A first processing unit receives a data update to a data block in a first storage device. Parity data for the data block is maintained in a second storage device. A parity group is comprised of the data block and the parity data. After determining that the first processing unit does not control access to the parity group including the data block to update, the first processing unit sends a message to a second processing unit controlling access to the parity group requesting control of access to the parity group. The first processing unit determines new parity data from the data update, the data at the data block in the first storage device, and the parity data in the second storage device. The first processing unit then writes the data update to the data block in the first storage device and the new parity data to the second storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating data, comprising the steps of:

receiving, with a first processing unit, a data update to a data block in a first storage device, wherein parity data for the data block is maintained in a second storage device, and wherein a parity group is comprised of the data block and the parity data;

processing by the first processing unit a first data structure indicating parity groups controlled by a second processing unit and determining, from processing the first data structure, that the second processing unit controls access to the parity group;

sending a message, with the first processing unit, to the second processing unit controlling access to the parity group requesting control of access to the parity group after determining that the first processing unit does not control access to the parity group including the data block to update;

modifying the first data structure by the first processing unit to indicate that the first processing unit controls access to the parity group after receiving a message from the second processing unit granting control of access to the parity group and wherein the second processing unit modifies a second data structure to indicate that that first processing unit controls access to the parity group to which the second processing unit granted control;

determining new parity data from the data update, the data at the data block in the first storage device, and the parity data in the second storage device; and writing the data update to the data block in the first storage device and the new parity data to the second storage device.

2. The method of claim 1, further comprising the steps of:

detecting a failure of the first storage device;

receiving an input/output (I/O) request to a target data block in the failed first storage device after detecting the failure of the first storage device, wherein parity data for the target data block is maintained in the second storage device;

determining, with the first processing unit, whether the first processing unit controls access to the target data block;

sending a message, with the first processing unit, to a second processing unit controlling access to the target data block requesting control of access to the target data block after determining that the first processing unit does not control access thereto;

indicating that the second processing unit cannot access the target data block;

determining lost data in the target data block from the parity data; and performing the I/O operation with the lost data.

3. The method of claim 2, wherein the parity data maintains parity for the target data block and data blocks in at least one additional storage device, wherein the step of determining the lost data comprises taking the logical XOR of the parity data and the data blocks in the additional storage devices.

4. The method of claim 2, wherein the I/O operation is a read operation initiated by a requestor, and wherein the step of performing the I/O operation comprises providing the lost data to the requestor.

5. The method of claim 2, wherein the I/O operation is a write operation, and wherein the step of performing the I/O operation comprises the steps of:

determining the new parity data from the parity data, the data update, and the lost data;

writing the new parity data to the second storage device; and writing the data update to a third storage device used to rebuild data lost in the first storage device.

6. The method of claim 1, further comprising:

determining whether the first storage device failed;

sending a first message, with the first processing unit, to the second processing unit indicating the parity group to be updated after receiving the update and determining that the first storage device failed; and sending, with the first processing unit, a second message to the second processing unit indicating that the parity group was updated after writing the data update to the data block and the new parity data to the second storage device, wherein the second processing unit processes at least one of the first message and the second message to determine the parity groups not updated if the first processing unit fails while the first storage device was failed.

7. The method of claim 1, wherein a first cache is associated with the first processing unit and a second cache is associated with the second processing unit, further comprising the steps of sending, with the first processing unit, a message to the second processing unit requesting the second processing unit to invalidate data in the second cache corresponding to the data block to update, wherein the message requesting the second processing unit to invalidate data is transmitted with the message requesting control of access to the data block after determining that the first processing unit does not control access to the data block to update.

8. A method for updating data, comprising the steps of:
receiving, with a first processing unit, a data update to a data block in a first storage device, wherein parity data for the data block is maintained in a second storage device, and wherein a parity group is comprised of the data block and the parity data,
determining a parity group set including the parity group including the data block to update;
determining whether a first data structure indicates that another data block in the parity group set is being updated; and
sending, with the first processing unit, a message to the second processing unit including information on the parity group set including the data block to be updated and a second data structure indicating parity groups recently updated after determining that the first data structure does not indicate that another data block in the parity group set is being updated;
sending a message, with the first processing unit, to a second processing unit controlling access to the parity group requesting control of access to the parity group after determining that the first processing unit does not control access to the parity group including the data block to update;
determining new parity data from the data update, the data at the data block in the first storage device, and the parity data in the second storage device; and
writing the data update to the data block in the first storage device and the new parity data to the second storage device.

9. The method of claim 8, further including the steps of:
incrementing a parity group set count field for the parity group set including the data block to update;
decrementing the parity group set count field after writing the data update and the new parity data;
determining whether the parity group set count field is zero;
indicating in the first data structure that the updated parity group set includes no data blocks being updated after determining that the parity group set count field is zero; and
indicating in the second data structure that the parity group set was recently updated after determining that the parity group set count field is zero.

10. A system for updating data, comprising
(a) a first storage device including data at a data block;
(b) a second storage device including parity data for the data block, wherein a parity group is comprised of the data block to be updated and the parity data;
(c) a first processing unit;
(d) a second processing unit;
(e) program logic executed by the first processing unit, including:
(i) means for receiving a data update to a data block in a first storage device, wherein parity data for the data block is maintained in a second storage device, and wherein a parity group is comprised of the data block and the parity data;
(ii) means for sending a message to a second processing unit controlling access to the parity group requesting control of access to the parity group after determining that the first processing unit does not control access to the parity group including the data block to update;
(iii) means for determining new parity data from the data update, the data at the data block in the first storage device, and the parity data in the second storage device;
(iv) means for writing the data update to the data block in the first storage device and the new parity data to the second storage device;
(v) means for determining a parity group set including the parity group including the data block to update after receiving the data update;
(vi) means for processing a first data structure to determine whether another data block in the parity group set is being updated; and
(vii) means for sending a message to the second processing unit including information on the parity group set including the data block to be updated and a second data structure indicating parity groups recently updated after determining that the first data structure does not indicate that another data block in the parity group set is being updated.

11. The system of claim 10, wherein the program logic executed by the first processing unit further comprises:
means for detecting a failure of the first storage device;
means for receiving an input/output (I/O) request to a target data block in the failed first storage device after detecting the failure of the first storage device, wherein parity data for the target data block is maintained in the second storage device;
means for determining whether the first processing unit controls access to the target data block;
means for sending a message to the second processing unit controlling access to the target data block requesting control of access to the target data block after determining that the first processing unit does not control access thereto;
means for indicating that the second processing unit cannot access the target data block;
means for determining lost data in the target data block from the parity data; and
means for performing the I/O operation with the lost data.

12. The system of claim 11, further comprising at least one additional storage device, wherein the parity data maintains parity for the target data block and data blocks in the additional storage device, wherein the means, performed by the first processing unit, for determining the lost data comprises taking the logical XOR of the parity data and the data blocks in the additional storage devices.

13. The system of claim 11, wherein the I/O operation is a read operation initiated by a requestor and wherein the means for performing the I/O operation comprises the first processing unit providing the lost data to the requestor.

14. The system of claim 11, wherein the I/O operation is a write operation, and wherein the means for performing the I/O operation comprises:

means for determining the new parity data from the parity data, the data update, and the lost data;

means for writing the new parity data to the second storage device; and means for writing the data update to a third storage device used to rebuild data lost in the first storage device.

15. The system of claim 10, wherein the program logic executed by the first processing unit further comprises:

means for determining whether the first storage device failed;

means for sending a first message to the second processing unit indicating the parity group to be updated after receiving the update and determining that the first storage device failed; and means for sending a second message to the second processing unit indicating that the parity group was updated after writing the data update to the data block and the new parity data to the second storage device, wherein the second processing unit processes at least one of the first message and the second message to determine the parity groups not updated if the first processing unit fails while the first storage device was failed.

16. The system of claim 10, further comprising:

a first cache associated with the first processing unit; and a second cache associated with the second processing unit, wherein the program logic, executed by the first processing unit, further includes means for sending a message to the second processing unit requesting the second processing unit to invalidate data in the second cache corresponding to the data block to update after receiving the data update to the data block.

17. An article of manufacture for use in programming a first processing unit to update data at a data block in a first storage device with a data update, wherein parity data for the data block is maintained in a second storage device, wherein a parity group is comprised of the data block to be updated and the parity data, the article of manufacture comprising at least one computer readable storage device including at least one computer program embedded therein that causes the first processing unit to perform the steps of:

receiving a data update to a data block in a first storage device, wherein parity data for the data block is maintained in a second storage device, and wherein a parity group is comprised of the data block and the parity data;

processing by the first processing unit a first data structure indicating parity groups controlled by a second processing unit and determining, from processing the first data structure, that the second processing unit controls access to the parity group;

sending a message to the second processing unit controlling access to the parity group requesting control of access to the parity group after determining that the first processing unit does not control access to the parity group including the data block to update;

modifying the first data structure by the first processing unit to indicate that the first processing unit controls access to the parity group after receiving a message from the second processing unit granting control of access to the parity group, wherein the article of manufacture further comprises at least one computer program that causes the second processing unit to perform the steps of modifying a second data structure to indicate that that first processing unit controls access to the parity group to which the second processing unit granted control;

determining new parity data from the data update, the data at the data block in the first storage device, and the parity data in the second storage device; and writing the data update to the data block in the first storage device and the new parity data to the second storage device.

18. The article of manufacture of claim 17, further comprising the steps of:

detecting a failure of the first storage device;

receiving an input/output (I/O) request to a target data block in the failed first storage device, wherein parity data for the target data block is maintained in the second storage device;

determining whether the first processing unit controls access to the target data block;

sending a message to the second processing unit controlling access to the target data block requesting control of access to the target data block after determining that the first processing unit does not control access thereto;

indicating that the second processing unit cannot access the target data block;

determining lost data in the target data block from the parity data; and performing the I/O operation with the lost data.

19. The article of manufacture of claim 18, wherein the parity data maintains parity data for the target data block and data blocks in additional storage devices, wherein the step of determining the lost data comprises taking the logical XOR of the parity data and the data blocks in the additional storage devices.

20. The article of manufacture of claim 18, wherein the I/O operation is a read operation initiated by a requester and wherein the step of performing the I/O operation comprises providing the lost data to the requestor.

21. The article of manufacture of claim 18, wherein the I/O operation is a write operation, and wherein the step of performing the I/O operation comprises the steps of:

determining the new parity data from the parity data, the data update, and the lost data;

writing the new parity data to the second storage device; and writing the data update to a third storage device used to rebuild data lost in the first storage device.

22. The article of manufacture of claim 17, further causing the first processing unit to perform the steps of:

detecting the failure of the first storage device;

sending a first message to the second processing unit indicating the parity group to be updated after detecting the failure of the fist storage device and receiving the update; and sending a second message to the second processing unit indicating that the parity group was updated after writing the data update to the data block and the new parity data to the second storage device, wherein the article of manufacture further comprises at least one computer program that causes the second processing unit to process at least one of the first message and the second message to determine the parity groups not updated if the first processing unit fails while the first storage device was failed.

23. The article of manufacture of claim 17, wherein a first cache is associated with the first processing unit and a second cache is associated with the second processing unit, further causing the first processing unit to perform the steps of sending a message to the second processing unit requesting the second processing unit to invalidate data in the second cache corresponding to the data block to update after receiving the data update to the data block.

24. An article of manufacture for use in programming a first processing unit to update data at a data block in a first storage device with a data update, wherein parity data for the data block is maintained in a second storage device, wherein a parity group is comprised of the data block to be updated and the parity data, the article of manufacture comprising at least one computer readable storage device including at least one computer program embedded therein that causes the first processing unit to perform the steps of:

receiving a data update to a data block in a first storage device, wherein parity data for the data block is maintained in a second storage device, and wherein a parity group is comprised of the data block and the parity data, determining, by the first processing unit, a parity group set including the parity group including the data block to update;

determining, by the first processing unit, whether a first data structure indicates that another data block in the parity group set is being updated; and sending a message from the first processing unit to a second processing unit including information on the parity group set including the data block to be updated and a second data structure indicating parity groups recently updated after determining that the first data structure does not indicate that another data block in the parity group set is being updated;

sending a message to the second processing unit controlling access to the parity group requesting control of access to the parity group after determining that the first processing unit does not control access to the parity group including the data block to update;

determining new parity data from the data update, the data at the data block in the first storage device, and the parity data in the second storage device; and writing the data update to the data block in the first storage device and the new parity data to the second storage device.

25. The article of manufacture of claim 24, further causing the first processing unit to perform the steps of:

incrementing a parity group set count field for the parity group set including the data block to update after determining the parity group set including the parity group to update;

decrementing the parity group set count field after writing the data update and the new parity data;

determining whether the parity group set count field is zero;

indicating in the first data structure that the updated parity group set includes no data blocks being updated after determining that the parity group set count field is zero; and indicating in the second data structure that the parity group set was recently updated after determining that the parity group set count field is zero.

26. A memory for storing data for access by a first processing unit comprising ownership data indicating parity groups controlled by the first processing unit and a second processing unit, wherein a parity group is comprised of a data block and parity data for the data block, wherein the first processing unit processes the ownership data to determine whether the first processing unit controls access to the parity group after receiving update data to a data block in the parity group, wherein the first processing unit sends a message to the second processing unit controlling access to the parity group requesting control of access to the parity group after determining that the first processing unit does not control access thereto, wherein the first processing unit determines the new parity data from the data update, the data at the data block, and the parity data and writes the data update to the data block in the first storage device and the new parity data to the second storage device;

wherein the ownership data processed by the first processing unit is first ownership data, wherein the first processing unit modifies the first ownership data to indicate that the first processing unit controls access to the parity group after receiving a message from the second processing unit granting control of access to the parity group, further comprising a second memory including second ownership data for access by the second processing unit indicating parity groups controlled by the second processing unit and the first processing unit, wherein the second processing unit modifies the second ownership data to indicate that that first processing unit controls access to the parity group to which the second processing unit granted control.

27. The memory device of claim 26, further comprising a first data structure indicating parity group sets, wherein a parity group set includes a plurality of parity groups and a second data structure indicating parity groups recently updated, wherein the first processing unit processes the first data structure to determine a parity group set including the parity group including the data block to update after receiving the data update, wherein the first processing unit further processes the first data structure to determine whether another data block in the parity group set is being updated, and wherein the first processing unit sends a message to the second processing unit including information on the parity group set including the data block to be updated and the second data structure after determining that the first data structure does not indicate that another data block in the parity group set is being updated.

28. The memory of claim 27, further comprising a parity group set count field, wherein the first processing unit increments a value in the parity group set count field for the parity group set including the data block to update after receiving the data update, wherein the first processing unit decrements the value in the parity group set count field after writing the data update and the new parity data, wherein the first processing unit processes the parity group set count filed to determine whether the parity group set count field is zero, and wherein the first processing unit indicates in the first data structure that the updated parity group set includes no data blocks being updated after determining that the parity group set count field for the parity group set is zero.

* * * * *